(12) United States Patent
Koga

(10) Patent No.: US 7,007,971 B2
(45) Date of Patent: Mar. 7, 2006

(54) GAS GENERATOR

(75) Inventor: Koji Koga, Imari (JP)

(73) Assignee: Takata Corporation, Tokyo (JP)

( * ) Notice: Subject to any disclaimer, the term of this patent is extended or adjusted under 35 U.S.C. 154(b) by 104 days.

(21) Appl. No.: 10/101,395

(22) Filed: Mar. 20, 2002

(65) Prior Publication Data

US 2002/0135172 A1  Sep. 26, 2002

(30) Foreign Application Priority Data

Mar. 21, 2001  (JP)  .............................. 2001-080975

(51) Int. Cl.
*B60R 21/26* (2006.01)
(52) U.S. Cl. ..................... 280/736; 280/741; 280/742
(58) Field of Classification Search ................ 280/736, 280/741, 742, 731, 740; 102/53, 530
See application file for complete search history.

(56) References Cited

U.S. PATENT DOCUMENTS

| | | | | |
|---|---|---|---|---|
| 4,578,247 A | * | 3/1986 | Bolieau ...................... 422/165 |
| 5,516,147 A | * | 5/1996 | Clark et al. ................. 280/737 |
| 5,746,445 A | * | 5/1998 | Johnson et al. ............. 280/741 |
| 6,019,389 A | * | 2/2000 | Burgi et al. ................. 280/736 |
| 6,053,531 A | * | 4/2000 | Katsuda et al. ............. 280/741 |
| 6,126,197 A | * | 10/2000 | Muir et al. .................. 280/741 |
| 6,168,200 B1 | * | 1/2001 | Greist et al. ................. 280/736 |
| 6,189,924 B1 | * | 2/2001 | Hock .......................... 280/736 |
| 6,199,906 B1 | * | 3/2001 | Trevillyan et al. ........... 280/741 |
| 6,257,617 B1 | * | 7/2001 | McFarland et al. ......... 280/736 |
| 6,315,322 B1 | * | 11/2001 | Mika .......................... 280/736 |
| 6,422,601 B1 | * | 7/2002 | Quioc ......................... 280/741 |
| 6,540,256 B1 | * | 4/2003 | Iwai et al. ................... 280/736 |
| 6,626,461 B1 | * | 9/2003 | Koga et al. ................. 280/736 |
| 6,886,856 B1 | * | 5/2005 | Canterberry et al. ........ 280/741 |
| 6,899,351 B1 | * | 5/2005 | Saso et al. .................. 280/736 |
| 6,929,284 B1 | * | 8/2005 | Saso et al. .................. 280/741 |

* cited by examiner

*Primary Examiner*—Paul N. Dickson
*Assistant Examiner*—Toan C. To
(74) *Attorney, Agent, or Firm*—Foley & Lardner LLP

(57) ABSTRACT

A gas generator is provided in which partitions for forming a plurality of gas-generation chambers are easily mounted. A detonator disposed in a booster tube is ignited by an initiator for the booster tube. A gas-generating agent disposed above or below a partition plate reacts to the reaction gas from the detonator, and a gas passes through a filter and is ejected through gas outlets. Booster tubes include larger diameter portions at the upper portions of the booster tubes, and smaller diameter portions at the lower portions of the booster tubes. The larger diameter portions are formed in a diameter-enlarging process. During formation of the gas generator, the booster tubes are individually inserted into holes of the partition plate from the smaller diameter portions of the booster tubes.

17 Claims, 3 Drawing Sheets

GAS GENERATOR

BACKGROUND

The present invention relates to gas generators which can be conveniently installed in airbag devices. In particular, the present invention relates to a gas generator capable of performing gas ejection in multiple stages.

Airbag device to be mounted in fast-moving bodies such as automobiles includes gas generator which is so-called inflator, module cover which covers the airbag, and the like. The gas generator operates to inflate airbag which receives passenger's body when the automobiles encounter emergencies such as collisions.

A gas generator typically includes a cylindrical partition (booster tube) in a container, the cylindrical partition being provided with a detonator (booster propellant) inside the booster tube and a gas-generating agent (main propellant) outside the booster tube.

The booster tube is also provided with an initiator (electrical igniter). The detonator ignites when electric current is supplied to the initiator. When the detonator ignites, gas is ejected from an aperture of the booster tube, the gas-generating agent ignites, a large volume of gas is rapidly generated, and the generated gas is ejected to the outside of the gas generator and inflates an airbag.

A multi-stage-type (multiple-step gas-ejection) gas generator may include a container divided into a plurality of chambers defined by partition plates, each containing a gas-generating agent. The gas-generating agents contained in the plurality of chambers are independently ignited by initiators. Partition plates are each provided with a hole to be coupled with a cylindrical booster tube, and the booster tube is firmly coupled with and welded to the hole.

SUMMARY OF THE INVENTION

Accordingly, an object of the present invention is to provide a gas generator in which partition plates can be easily coupled with booster tubes (cylindrical partition members).

A gas generator according to the present invention comprises a container; a gas-generating agent disposed in the container; a detonator for igniting the gas-generating agent; and at least one initiator for igniting the detonator. The container is provided therein with at least one cylindrical first partition member, the detonator being disposed in the first partition member. A plurality of clambers for containing the gas-generating agent are formed outside the at least one first partition member by using a second partition member. The second partition member is provided with at least one through-hole to be coupled with the at least one first partition member. One portion of the first partition member toward a longitudinal end thereof has a diameter larger than the diameter of the other portion of the first partition member, and the through-hole of the second partition member is coupled with the portion of the first partition member having a larger diameter.

In the gas generator, when the first partition member is coupled with the through-hole of the second partition member, the larger diameter portion can be coupled with the through-hole after the smaller diameter portion passes through the through-hole. Therefore, when an end face of the larger diameter portion is fixed to the container, the press-fitting stroke of the second partition member can be reduced, thereby facilitating the manufacture.

According to the present invention, the diameter of one portion of the first partition member is preferably set larger than the other portion thereof in a diameter-enlarging process. By using this process, the manufacturing cost can be significantly reduced compared with a case of reducing the diameter of the other portion by cutting.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
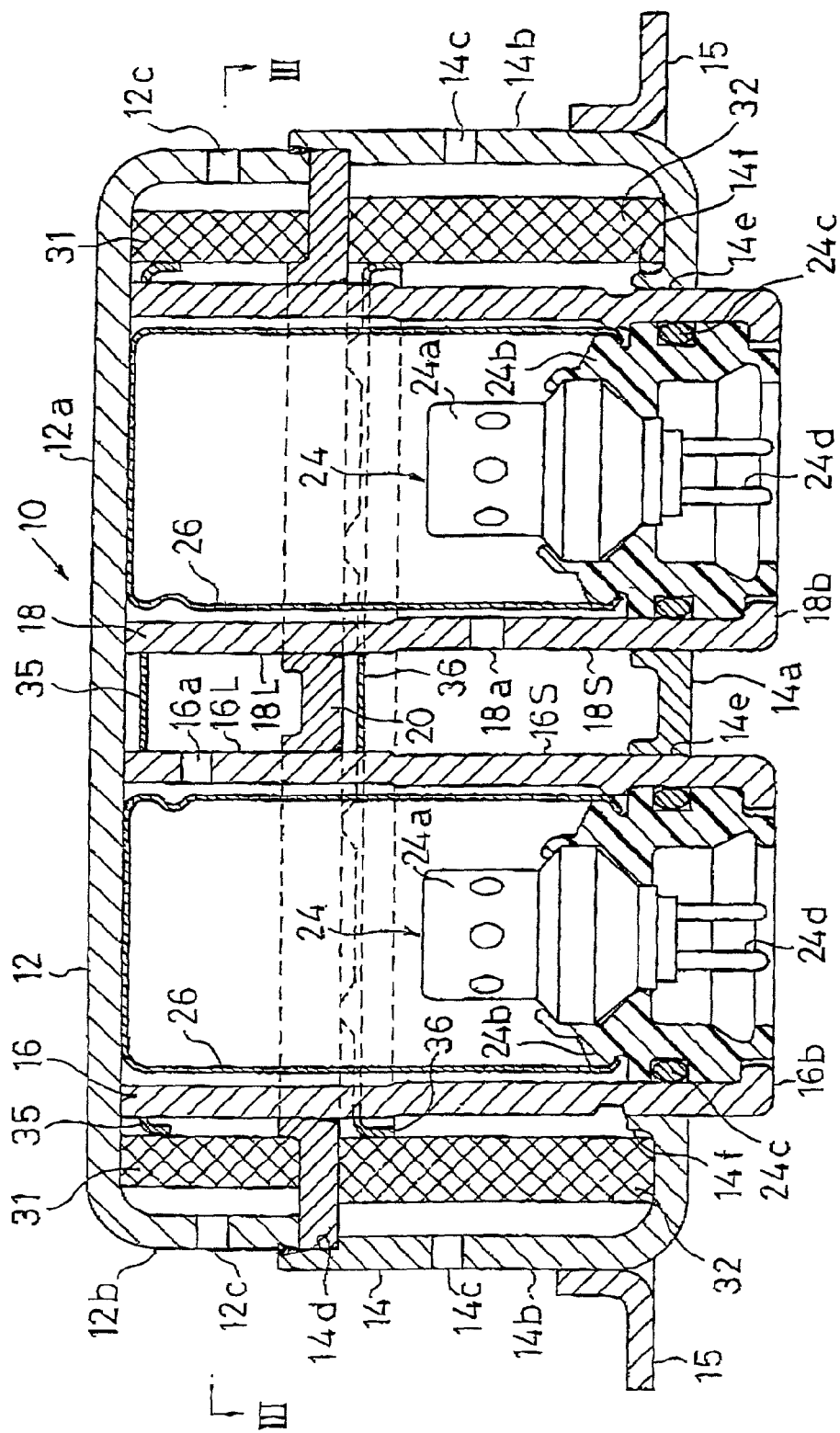
FIG. 1 is a sectional view of a gas generator according to an embodiment of the present invention.
Figure 2:
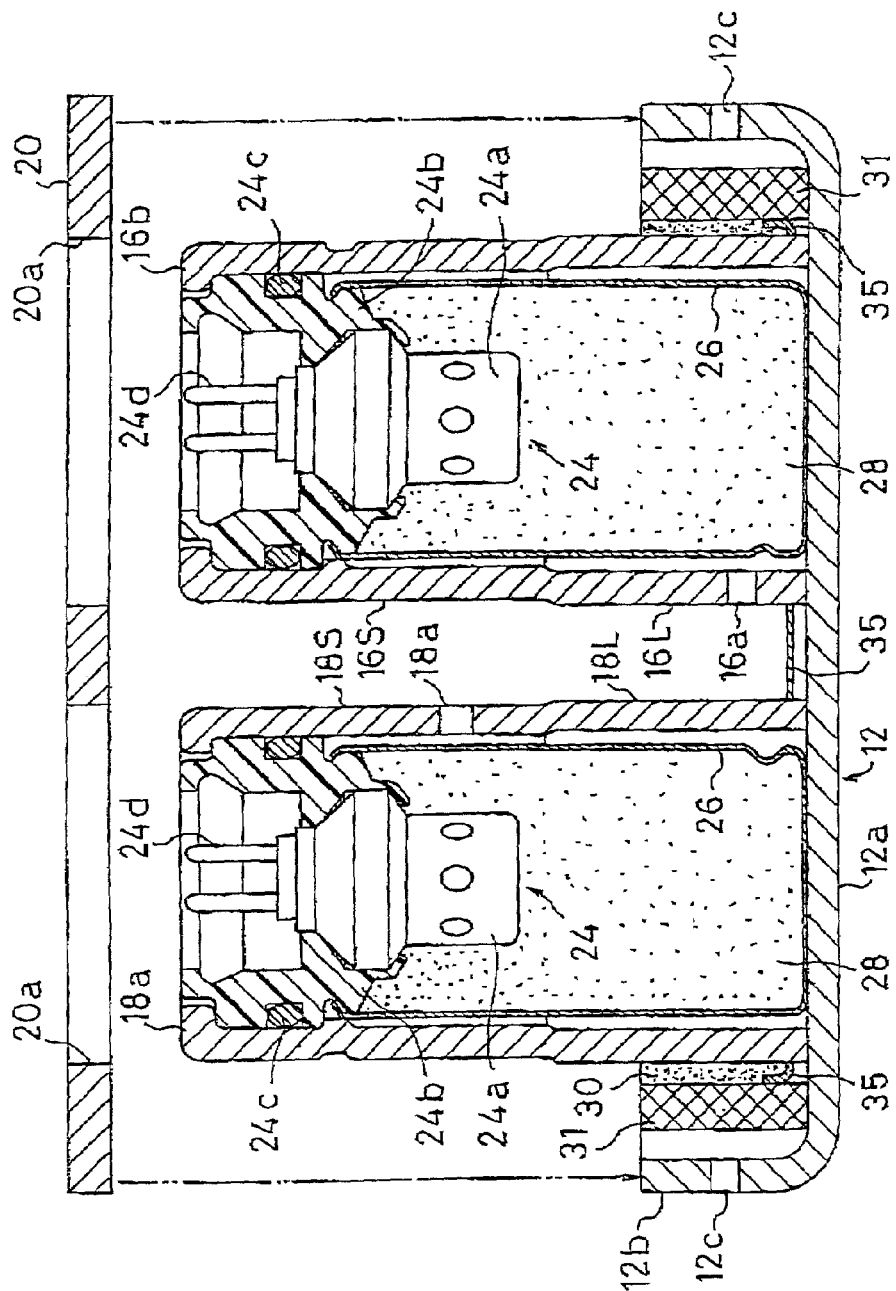
FIG. 2 is an illustration showing a manufacturing process of the gas generator shown in FIG. 1.
Figure 3:
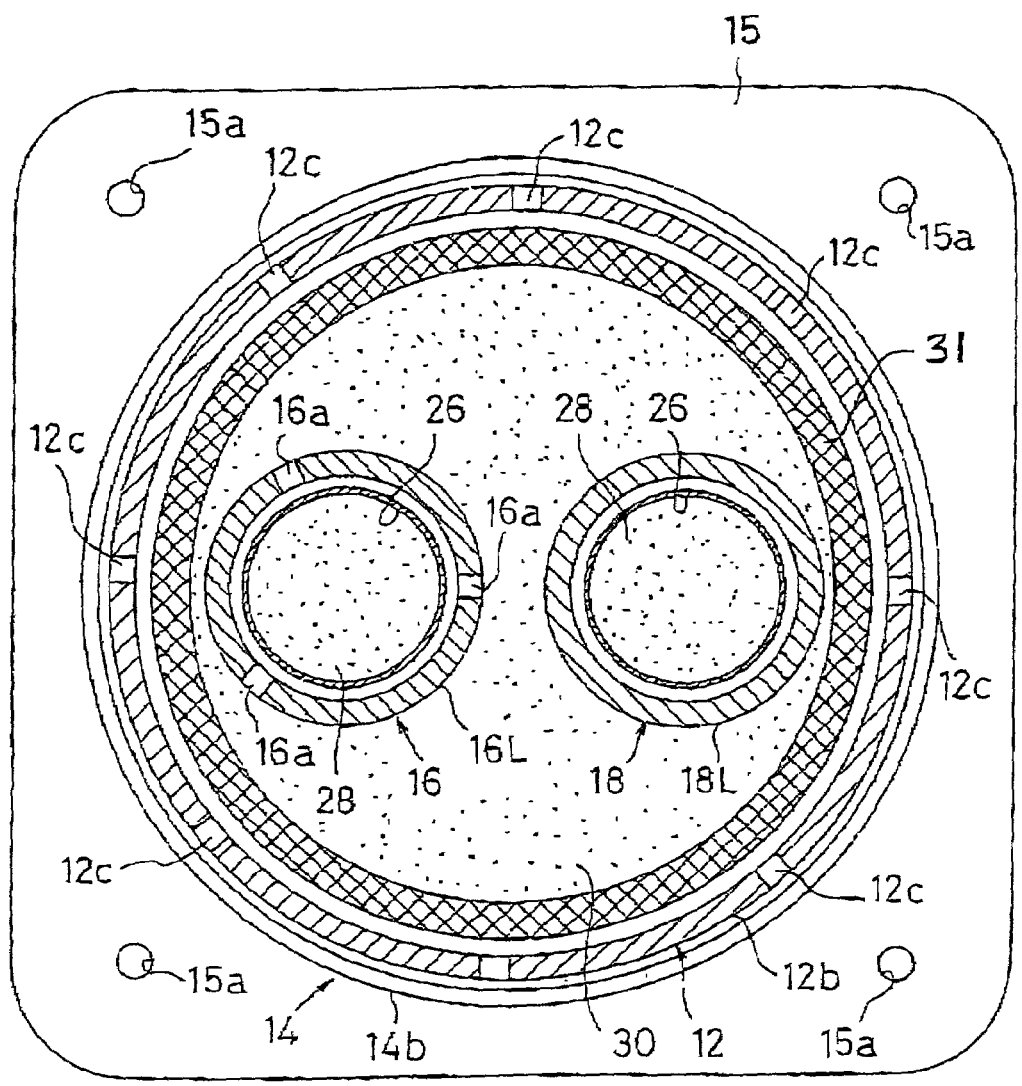
FIG. 3 is a sectional view along line III—III of the gas generator shown in FIG. 1.

Embodiments according to the present invention are described below with reference to FIGS. 1 to 3. As shown in FIG. 1, a gas generator 10 includes an upper housing 12, a lower housing 14, two cylindrical booster tubes 16 and 18, as first partition members, and a partition plate 20 as a second partition member, a part of each booster tube 16 or 18 protruding from the lower housing 14.

The upper housing 12 includes a substantially circular top plate 12a and a peripheral wall 12b downward extending from the periphery of the top plate 12a. A plurality of gas outlets 12c are formed in the peripheral wall 12b.

The cylindrical booster tubes 16 and 18 are positioned such that the longitudinal axes thereof are generally perpendicular to the top plate 12a, and are fixed to the top plate 12a at the upper faces of the respective booster tubes 16 and 18 by welding (e.g., projection welding). However, the scope of the invention is not limited to welding the booster tubes to the top plate. The booster tubes may be fixed to the top plate by other suitable methods.

The booster tubes 16 and 18 include larger diameter portions 16L and 18L at the upper parts thereof, respectively, and smaller diameter portions 16S and 18S at the lower parts thereof, respectively. The outer diameter of each of the larger diameter portions 16L and 18L is slightly larger (by, for example, in the order of 0.1 to 1 mm) than the outer diameter of each of the smaller diameter portions 16S and 18S. According to the present embodiment, the larger diameter portions 16L and 18L are each formed such that the diameter of a cylinder as a material of each of the booster tubes 16 and 18 is increased at a part of the cylinder toward a longitudinal end thereof by using a die or the like.

Pluralities of gas outlets 16a and 18a are formed in the peripheries of the booster tubes 16 and 18, respectively. The gas outlets 16a are formed in the larger diameter portion 16L of the booster tube 16 and the gas outlets 18a are formed in the small diameter portion 18S of the booster tube 18.

The lower housing 14 includes a substantially circular bottom 14a and a peripheral wall 14b upward extending from the bottom 14a. A plurality of gas outlets 14c are formed in the peripheral wall 14b.

The peripheral wall 14b is provided with a step 14d formed in an upper inner-peripheral edge of the peripheral wall 14b. The partition plate 20 as the second partition member is disposed between the upper housing 12 and the lower housing 14, whereby the container for the gas-generating agent is divided into the upper and lower chambers. A gas-generating agent 30 is charged in each upper or lower chamber.

The partition plate 20 is circular. The partition plate 20 is anchored to the step 14d of the lower housing 14 and is sandwiched by the lower housing 14 and the upper housing 12 at the periphery of the partition plate 20.

The partition plate 20 is provided with two holes 20a (see FIG. 2) formed therein. The booster tubes 16 and 18 are inserted into the holes 20a, respectively. The inner diameters of the holes 20a before the booster tubes 16 and 18 are inserted are each larger than the outer diameters of the smaller diameter portions 16S and 18S of the booster tubes 16 and 18, respectively, and are each smaller than the diameters of the larger diameter portions 16L and 18L of the booster tubes 16 and 18, respectively. As shown in FIG. 2, the smaller diameter portions 16S and 18S are inserted into the holes 20a, respectively, of the partition plate 20, then, the larger diameter portions 16L and 18L are press-fitted to the respective holes 20a creating an interference fit between the larger diameter portions 16L, 18L and the holes 20a. The partition plate 20 is welded to the booster tubes 16 and 18.

The gas outlets 16a are disposed at the upper side (toward the upper housing 12) of the partition plate 20, and the gas outlets 18a are disposed at the lower side (toward the lower housing 14) of the partition plate 20.

The lower housing 14 is provided with a flange 15 fixed thereto by welding at the peripheral face of the peripheral wall 14b of the lower housing 14. As shown in FIG. 3, the flange 15 is substantially square and is provided with through-holes 15a for bolts, rivets, or the like at four corners of the flange 15.

The lower housing 14 is provided with two circular apertures 14e in the bottom 14a thereof. The booster tubes 16 and 18 pass through the respective apertures 14e. The margin of each aperture 14e upward projects to form as an annular part 14f. The annular parts 14f are formed by burring process to the bottom 14a, according to the present embodiment. The method for forming the annular parts 14f is not limited to burring.

The booster tubes 16 and 18 individually protrude downward (to the outside) passing through the apertures 14e in respective portions toward the lower ends of the booster tubes 16 and 18. Initiators 24 are individually inserted into the booster tubes 16 and 18 at the lower parts thereof. Each initiator 24 includes an initiator body 24a, and a substantially cylindrical initiator-holder 24b coupled around the initiator body 24a. Each initiator holder 24b is provided with a groove around the periphery of the initiator holder 24b. A seal ring 24c is disposed in the groove. The seal ring 24c is hermetically in contact with the inner peripheral face of each of the booster tubes 16 and 18.

The booster tubes 16 and 18 are provided with rims 16b and 18b, respectively, bent toward the inside by caulking or the like at the lower ends of the booster tubes 16 and 18. The initiator holders 24b individually anchor to the rims 16b and 18b at the lower ends of the initiator holders 24b. Terminals 24d disposed at the lower ends of the initiators 24 are individually connected to initiator connectors (not shown).

The booster tubes 16 and 18 are individually provided with enhancer cups 26 therein which are made of a metal having a low melting point, such as aluminum. A detonator (booster propellant) 28 is disposed in each enhancer cup 26. When electric current is supplied to the initiator 24, the booster propellant starts reaction. When the temperature and gas pressure in the enhancer cups 26 are sufficiently increased, the enhancer cups 26 are broken, gas is ejected through the gas outlets 16a or 18a and is applied to the gas-generating agent (main propellant) 30, and the gas-generating agent 30 starts reaction for gas generation.

In a portion above the partition plate 20 of the chamber for containing a gas-generating agent, the gas-generating agent 30 is charged between the booster tubes 16 and 18 and a filter 31. In a portion below the partition plate 20 of the chamber, the gas-generating agent 30 is disposed between the booster tubes 16 and 18 and a filter 32. The filters 31 and 32 are made with net or mesh of a metallic wire, being formed as cylinders by press molding, and are disposed along the inner faces of the peripheral walls 12b and 14b, respectively.

Substantially circular filter-positioning members 35 and 36 each provided with through-holes for the booster tubes 16 and 18 are disposed between the inner face of the filter 31 and the booster tubes 16 and 18 and between the inner face of the filter 31 and 32 and the booster tubes 16 and 18, respectively.

When manufacturing the gas generator 10, the upper housing 12 and the booster tubes 16 and 18 are firstly fixed to each other by projection welding or the like. The enhancer cup 26, the detonator 28, and the initiator 24 are inserted into each of the booster tubes 16 and 18. The rims 16b and 18b are formed at the lower ends of the booster tubes 16 and 18, respectively, by caulking.

The upper housing 12 is placed such that the inner part thereof faces upward. The filter 31 is mounted to the upper housing 12 together with the filter-positioning member 35, and the gas-generating agent 30 is charged between the filter 31 and the booster tubes 16 and 18. The partition plate 20 is mounted such that the booster tubes 16 and 18 are inserted into the respective holes 20a. The booster tubes 16 and 18 pass through the holes 20a smoothly at the smaller diameter portions 16S and 18S of the booster tubes 16 and 18, respectively, then, are press-fitted to the holes 20a at the larger diameter portions 16L and 18L of the booster tubes 16 and 18, respectively.

The peripheral faces of the booster tubes 16 and 18 are individually welded to the inner peripheral faces of the holes 20a by laser-beam welding.

The filter 32 is mounted above the partition plate 20 together with the filter-positioning member 36, and the gas-generating agent 30 is charged between the booster tubes 16 and 18 and the filter 32.

The lower housing 14 provided with the flange 15 fixed thereto is mounted conventionally to the upper housing 12 so as to cover the filter 32. The inner diameter of each aperture 14e of the lower housing 14 is smaller than the outer diameter of each of the smaller diameter portions 16S and 18S of the booster tubes 16 and 18, respectively, and each of the booster tubes 16 and 18 is press-fitted to the aperture 14e. The peripheral wall 14b of the lower housing 14 is press-fitted to the peripheral wall 12b of the upper housing 12 such that the step 14d mates with the partition plate 20 at the periphery thereof. Then, the contact parts between the booster tubes 16 and 18 and the respective apertures 14e, and the contact parts between the peripheral wall 12b, the peripheral wall 14b, and the partition plate 20 are each welded by laser-beam welding. When welding, the depth of weld-joint penetration at the contact parts between the peripheral walls 12b and 14b and the partition plate 20 (partition) is set to be sufficiently large.

After being formed as described above, the gas generator 10 is installed in an airbag device for, for example, a driver's seat, a front passenger's seat, a rear seat, a side pillar, or a head protector.

By applying electric current to the initiator 24 of the booster tube 16 of the gas generator 10, the detonator 28 disposed in the booster tube 16 is ignited, and the generated gas is ejected through the gas outlets 16a of the booster tube 16 and drives the gas-generating agent 30 disposed between the partition plate 20 and the upper housing 12 to react for gas generation, whereby a large volume of gas is generated, is ejected through the filter 31 and the gas outlets 12c of the upper housing 12, and inflates the airbag.

When applying the electric current to the initiator 24 of tie booster tube 18, the detonator 28 disposed in the booster tube 18 is ignited, and the generated gas is ejected through the gas outlets 18a of the booster tube 18 and drives the gas-generating agent 30 disposed between the partition plate 20 and the lower housing 14 to react for gas generation, whereby a large volume of the gas is generated, is ejected through the filter 32 and the gas outlets 14c of the lower housing 14, and inflates the airbag. Thus, the gas can be generated in two stages by applying electric current at an interval to the two initiators 24.

As described above, the larger diameter portions 16L and 18L of the booster tubes 16 and 18, respectively, are press-fitted into the holes 20a of the partition plate 20 after the smaller diameter portions 16S and 18S of the booster tubes 16 and 18, respectively, smoothly pass through the holes 20a of the partition plate 20, whereby the partition plate 20 can be easily mounted when the gas generator 10 is manufactured. Since the larger diameter portions 16L and 18L of the booster tubes 16 and 18 are formed by enlarging the diameters thereof, the manufacturing cost can be significantly reduced compared with a case of forming the smaller diameter portions 16S and 18S by cutting.

Although according to the embodiment described above, the gas generator can eject gas in two stages, the present invention is also applicable to a case in which the gas generator ejects gas in three or more stages by using two or more partition plates.

As described above, the gas generator according to the present invention can be manufactured at a low cost, in which a partition plate (second partition member) is easily mounted.

The priority application, Japanese Patent Application No. 2001-080975 filed on Mar. 21, 2001, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A gas generator comprising:
    a container;
    a gas-generating agent disposed in the container;
    a detonator for igniting the gas-generating agent;
    a cylindrical first partition member provided in the container, the detonator being disposed in the first partition member;
    a second partition member for forming a plurality of chambers for containing the gas-generating agent outside the at least one first partition member;
    wherein the second partition member is provided with at least one through-hole coupled with the at least one first partition member; and
    wherein the first partition member includes two portions, the first portion located at one end of the first partition member having a diameter larger than the second portion, and
    wherein the through-hole of the second partition member is coupled with the first portion of the first partition member
    wherein the container includes gas exits above the second partition and gas exits below the second partition.

2. The gas generator of claim 1, further comprising an initiator for igniting the detonator.

3. The gas generator of claim 1, wherein the coupling between the through hole in the second partition member and the first partition member is an interference fit.

4. The gas generator of claim 1, wherein the container includes a top section and a bottom section, the one end of the first partition member being connected to the top section.

5. The gas generator of claim 4, wherein the one end of the first partition member is placed apart from an initiator.

6. The gas generator of claim 1, further comprising a second detonator, wherein the second partition member divides the container into at least two chambers, so that the gas produced by the detonators does not mix before the exiting the container.

7. The gas generator of claim 1, further comprising at least one initiator.

8. A multi-stage gas generator including a container containing a gas-generating agent, a booster tube containing a detonator and a partition plate dividing the container into first and second chambers; wherein the booster tube includes an enlarged section press fitted into a hole in the partition plate; wherein the container includes a first set of gas exits for the first chamber and a second set of gas exits for the second chamber.

9. The gas generator of claim 8, further comprising a second booster tube containing a detonator, the second booster tube having an enlarged section press fitted into a second hole in the partition plate.

10. The gas generator of claim 9, wherein the partition plate is generally perpendicular to the longitudinal axis of the booster tube.

11. The gas generator of claim 8, wherein the partition plate is generally perpendicular to the longitudinal axis of the booster tube.

12. The gas generator of claim 9, wherein the first booster tube includes outlets into the first chamber and the second booster tube includes outlets into the second chamber.

13. The gas generator of claim 8, further comprising at least one initiator.

14. An airbag device, comprising:
    an airbag; and
    a gas generator;
    wherein the gas generator comprises:
        a container;
        a gas-generating agent disposed in the container;
        a detonator for igniting the gas-generating agent;
        a cylindrical first partition member provided in the container, the detonator being disposed in the first partition member;

a second partition member for forming a plurality of chambers for containing the gas-generating agent outside the at least one first partition member;

wherein the second partition member is provided with at least one through-hole coupled with the at least one first partition member; and wherein the first partition member includes two portions, the first portion located at one end of the first partition member having a diameter larger than the second portion, and wherein the through-hole of the second partition member is coupled with the first portion of the first partition member wherein the container includes gas exits above the second partition and gas exits below the second partition.

15. The airbag device of claim 14, further comprising at least one initiator.

16. An airbag device, comprising:

an airbag; and a multi-stage gas generator;

wherein the multi-stage gas generator includes a container containing a gas-generating agent, a booster tube containing a detonator and a partition plate dividing the container into first and second chambers; wherein the booster tube includes an enlarged section press fitted into a hole in the partition plate; wherein the container includes a set of gas exits for the first chamber and a set of gas exits for the second chamber.

17. The airbag device of claim 16, further comprising at least one initiator.

* * * * *